(12) United States Patent
Kawabata et al.

(10) Patent No.: US 12,127,541 B2
(45) Date of Patent: Oct. 29, 2024

(54) REEL BODY FOR A SPINNING REEL

(71) Applicant: Shimano Inc., Osaka (JP)

(72) Inventors: Takashi Kawabata, Osaka (JP);
Hirotaka Nagashima, Osaka (JP);
Muhd Syukri Nazry Bin Mustapha,
Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/892,560

(22) Filed: Aug. 22, 2022

(65) Prior Publication Data

US 2023/0157269 A1 May 25, 2023

(30) Foreign Application Priority Data

Nov. 19, 2021 (JP) ................. 2021-188765

(51) Int. Cl.
*A01K 89/015* (2006.01)
*B29C 45/14* (2006.01)
*B29L 31/00* (2006.01)

(52) U.S. Cl.
CPC ........ *A01K 89/01925* (2015.05); *B29C 45/14* (2013.01); *B29L 2031/7002* (2013.01)

(58) Field of Classification Search
CPC ............... A01K 89/01; A01K 89/0192; A01K 89/01925; A01K 89/01121; A01K 89/01127; A01K 89/01123; B29C 45/00; B29C 45/14; B29L 2031/52; B29L 2031/7002
USPC ....................................... 242/311
See application file for complete search history.

(56) References Cited

U.S. PATENT DOCUMENTS

| | | | | | |
|---|---|---|---|---|---|
| 1,728,619 | A | * | 9/1929 | Lambert | B26B 3/00 81/177.1 |
| 2,520,355 | A | * | 8/1950 | Bell | B25G 1/102 30/340 |
| 4,289,283 | A | * | 9/1981 | Morimoto | A01K 89/01127 242/316 |
| 4,830,306 | A | * | 5/1989 | Tsunoda | A01K 89/01 242/316 |
| 7,275,705 | B1 | * | 10/2007 | Wong | A01K 89/01 242/311 |

(Continued)

FOREIGN PATENT DOCUMENTS

| | | | |
|---|---|---|---|
| JP | S55104840 A | * | 8/1980 |
| JP | 56-96644 A | | 8/1981 |
| JP | H11346610 A | * | 12/1999 |

(Continued)

*Primary Examiner* — Michael R Mansen
*Assistant Examiner* — Henrix Soto
(74) *Attorney, Agent, or Firm* — Global IP Counselors, LLP

(57) ABSTRACT

A reel body for a spinning reel includes a foot portion configured to attach to a fishing rod, a housing having an accommodating portion, a leg portion extending from the housing toward the foot portion, and an insert element disposed in the housing and the leg portion. The foot portion, the housing, and the leg portion are integrally formed by injection molding, and the insert element includes a first portion that is disposed in the accommodating portion such that at least a part thereof is exposed, and a second portion that is integrally formed with the first portion and at least a part of which is disposed in a proximal end part of the leg portion.

14 Claims, 4 Drawing Sheets

(56) References Cited

U.S. PATENT DOCUMENTS

2004/0021023 A1\* 2/2004 Kitajima .......... A01K 89/01127
242/316

FOREIGN PATENT DOCUMENTS

| JP | 2011109966 A | \* | 6/2011 |
| JP | 2018157769 A | \* | 10/2018 |

\* cited by examiner

REEL BODY FOR A SPINNING REEL

CROSS-REFERENCE TO RELATED APPLICATIONS

This application claims priority to Japanese Patent Application No. 2021-188765, filed on Nov. 19, 2021. The entire disclosure of Japanese Patent Application No. 2021-188765 are hereby incorporated by reference.

BACKGROUND

Field of the Invention

The present disclosure relates to the reel body for a spinning reel.

Background Art

A conventional reel body for a spinning reel comprises a foot portion, a housing, and a leg portion. A fishing rod is attached to the foot portion. The housing has an accommodating portion for accommodating a mechanism. The leg portion extends from the housing toward the foot portion.

SUMMARY

It has been determined that in general, the leg portion of the reel body should preferably have a small cross-sectional area in consideration of its ability to be easily grasped. On the other hand, since the housing of the reel body contains an accommodating portion, the cross-sectional area of the housing is generally large.

When the leg portion and housing are formed as a single piece, if the cross-sectional area is significantly reduced at the proximal end part of the leg portion, which is the part that connects the leg portion and the housing, significant stress can be concentrated at the proximal end part of the leg portion, and the strength of the proximal end part of the leg portion may be decreased.

In order to avoid the foregoing, in the reel body of Japanese Laid-Open Patent Application No. Sho 56[1981]-096644, the proximal end part of the leg portion is formed such that its cross-sectional area gradually increases as it approaches the housing, and thin reinforcing core material is disposed into the leg portion. It has been determined that in this structure, the weight of the reel body will increase since the cross-sectional area (thickness) of the proximal end part of the leg portion is larger. Moreover, an increased cross-sectional area (thickness) of the proximal end part of the leg portion results in a longer required cooling time when the reel body is formed by injection molding, which can cause sink marks to appear on the outer surface of the reel body. Further, in the reel body of Japanese Laid-Open Patent Application No. Sho 56[1981]-096644, since there is no way to position the reinforcing core material inside the reel body, the disposition of the reinforcing core material can become unstable, and the reinforcing core material may become exposed to the surface of the reel body.

The object of the present disclosure is to describe a reel body for a spinning reel that has reduced weight and/or improved appearance.

The reel body for a spinning reel according to one aspect of the present invention comprises a foot portion for attachment to a fishing rod, a housing with an accommodating portion for accommodating a mechanism, a leg portion that extends from the housing toward the foot portion, and an insert element arranged in the housing and the leg portion. The foot portion, the housing, and the leg portion can be integrally formed by injection molding.

The insert element includes a first portion and a second portion. The first portion is placed in the accommodating portion such that at least a part of the first portion is exposed. The second portion is integrally formed with the first portion. At least part of the second portion is disposed within the proximal end part of the leg portion.

In the reel body, the thickness of the injection resin at the proximal end part of the leg portion can be reduced by placing at least part of the second portion of the insert element within the proximal end part of the leg portion, this configuration enables an improved appearance of the reel body that is free of sink marks on the surface. Further, the weight of the reel body can be reduced by using a lighter material than injection resin to form the insert element.

Further, since the first portion is disposed in the accommodating portion so that at least part of the first portion of the insert element is exposed, the exposed portion of the first portion can be used as a positioning means or device for the insert element, thereby making it possible to favorably position the insert element with respect to the proximal end part of the leg portion.

In the reel body for a spinning reel according to another aspect of the present invention, the second portion is preferably formed with a tapered shape. With this configuration, the cross-sectional area (thickness) of the proximal end part of the leg portion can be suitably reduced.

In the reel body for a spinning reel according to another aspect of the present invention, the second portion preferably has at least one recess. This configuration ensures that the second portion and the leg portion can be integrated into a single unit. Further, the second portion can be prevented from falling off the leg portion.

In the reel body for a spinning reel according to another aspect of the present invention, the thickness between the outer surface of the second portion and the outer surface of the leg portion is preferably up to 3.0 mm. With this configuration, the generation of sink marks can be suitably prevented.

In the reel body for a spinning reel according to another aspect of the present invention, the thickness between the outer surface of the second portion and the outer surface of the leg portion is preferably at least 1.5 mm. This configuration enables the material to suitably flow at the time of injection molding.

In the reel body for a spinning reel according to another aspect of the present invention, the first portion preferably has at least one hole. A positioning member that is fixed to a mold is fitted in the at least one hole portion. With this configuration, the insert element can be suitably positioned with respect to the proximal end part of the leg portion.

In the reel body for a spinning reel of the present disclosure, both reduced weight and improved appearance can be achieved at the same time.

DETAILED DESCRIPTION OF EMBODIMENTS

Figure 1:
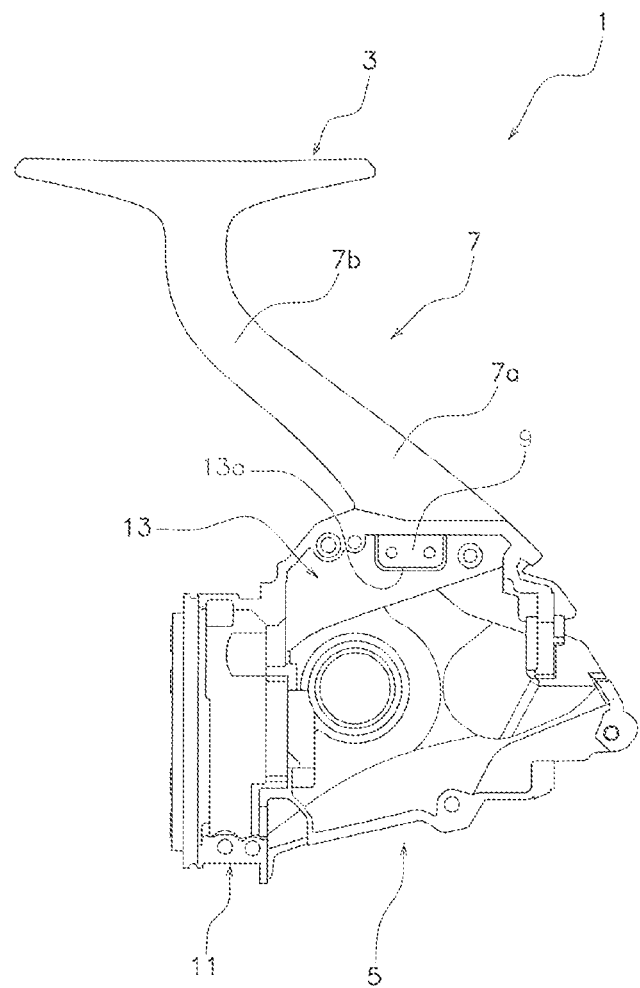
FIG. 1 is a side view of a reel body for a spinning reel according to an embodiment of the present invention (excluding an insert element).

The reel body 1 of a spinning reel in which an embodiment of the present invention is employed is shown in FIG. 1 and comprises a foot portion 3, a housing 5, a leg portion 7, and an insert element 9. The foot portion 3, the housing 5, and the leg portion 7 are integrally formed by injection molding. For example, the foot portion 3, the housing 5, and the leg portion 7 are formed from resin. The foot portion 3, the housing 5, and the leg portion 7 can be formed from other materials, such as metal.

The foot portion 3 can be attached to a fishing rod. The housing 5 has an accommodating portion 13. For example, the housing 5 has a cylindrical portion 11 and the accommodating portion 13. A rotor, not shown, is disposed in the cylindrical portion 11. A spool, not shown, is disposed at the front of the rotor.

Figure 2:
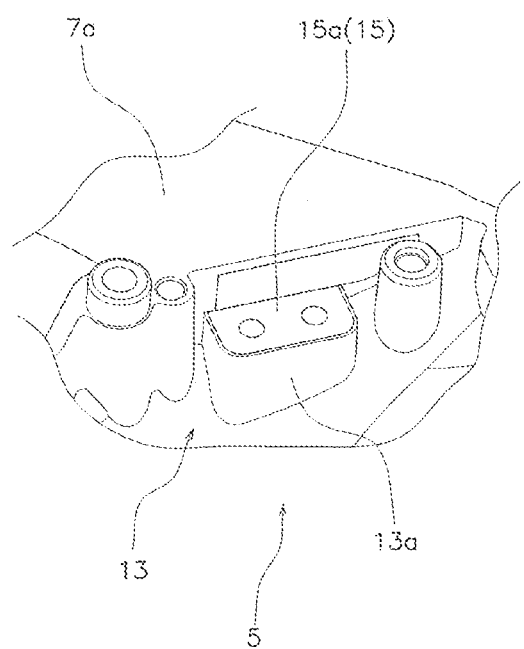
FIG. 2 is an enlarged perspective view of the part of the reel body that houses the first portion of the insert element.

Various mechanisms for operating the spinning reel are located in the accommodating portion 13. Such mechanisms, not shown, include a drive gear that rotates in conjunction with a handle, a spool shaft that is connected to the spool, a pinion gear that engages with the drive gear and rotates the rotor, and an oscillating mechanism that moves the spool shaft back and forth in conjunction with the rotation of the pinion gear. As shown in FIGS. 1 and 2, the accommodating portion 13 includes a retaining part 13a. The retaining part 13a covers a retained part 15a (described further below) of a first portion 15 shown in FIG. 4.

As shown in FIG. 1, the leg portion 7 extends from the housing 5 toward the foot portion 3. The leg portion 7 has a proximal end part 7a and a distal end part 7b. The proximal end part 7a is disposed on the accommodating portion 13 side of the leg portion 7. The proximal end part 7a is integrally formed with the accommodating portion 13 by injection molding.

The distal end part 7b is disposed on the foot portion 3 side of the leg portion 7. The distal end part 7b is integrally formed with the proximal end part 7a and the foot portion 3 by injection molding. That is, the proximal end part 7a and the distal end part 7b are integrally formed with the housing 5 and the foot portion 3 by injection molding.

Figure 3:
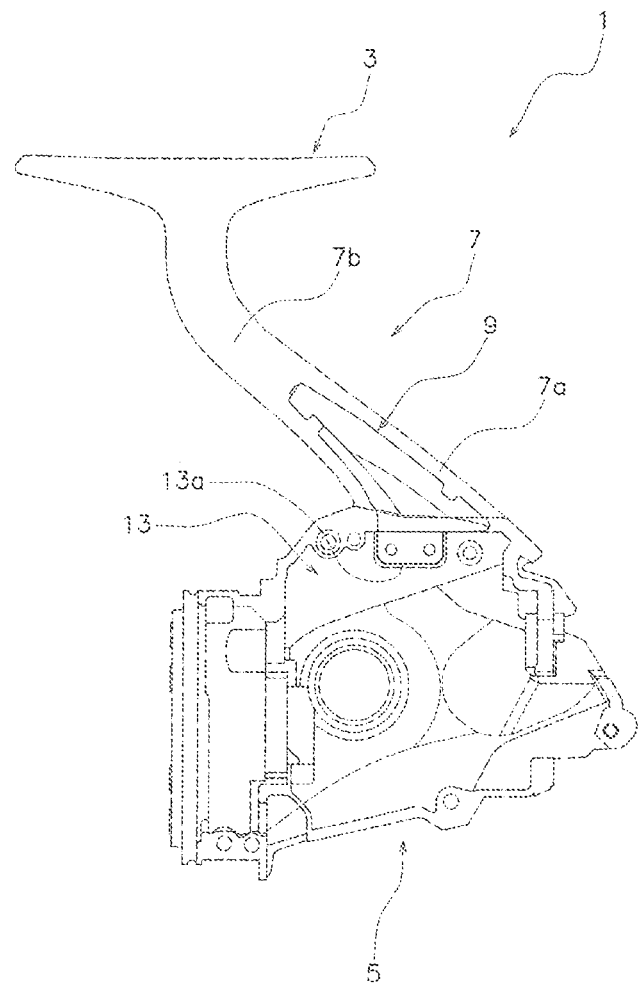
FIG. 3 is a side view of the reel body for a spinning reel (including the insert element).
Figure 4:
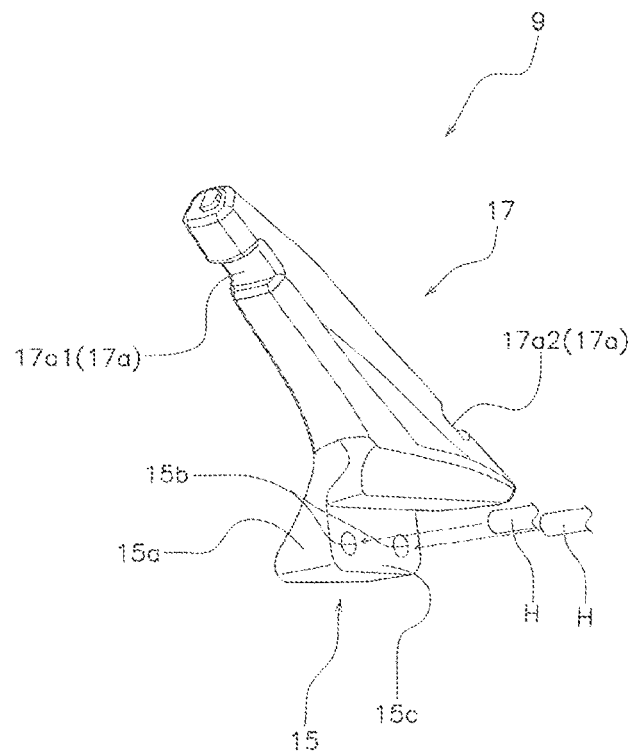
FIG. 4 is an external perspective view of the insert element.

As shown in FIG. 3, the insert element 9 is located within the housing 5 and the leg portion 7. For example, the insert element 9 is formed from resin. The insert element 9 can be formed form other materials, such as metal. The insert element 9 should be of lighter material than the resin of the foot portion 3, the housing 5, and the leg portion 7. As shown in FIG. 4, the insert element 9 includes the first portion 15 and a second portion 17.

Figure 5:
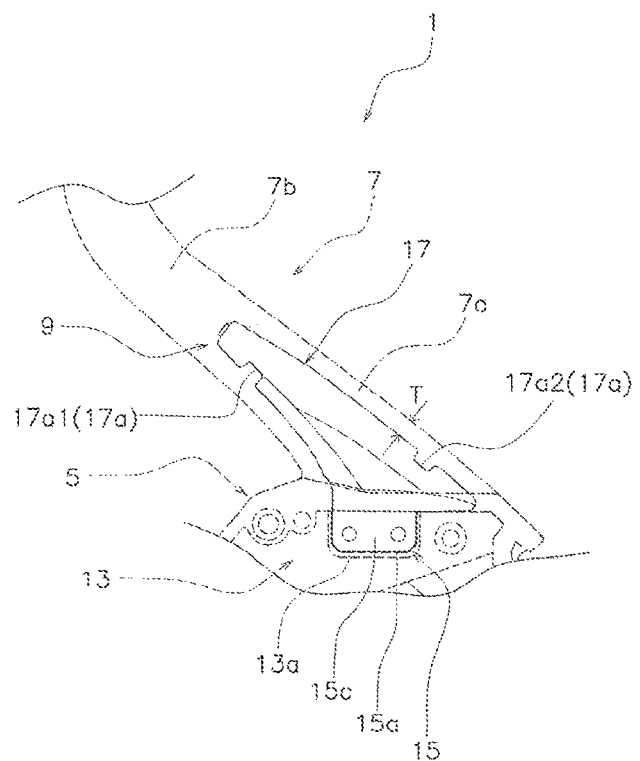
FIG. 5 is a partially enlarged perspective view of the leg portion, housing, and insert element.

As shown in FIG. 5, the first portion 15 is disposed in the accommodating portion 13 so that at least part of the first portion 15 is exposed. In this embodiment, with the insert element 9 placed in the housing 5 and the leg portion 7, the first portion 15 is arranged in the accommodating portion 13 such that part of the first portion 15, e.g., exposed surface 15c, is exposed.

As shown in FIG. 4, the first portion 15 comprises the retained part 15a and at least one hole 15b. The retained part 15a is held by a positioning member H when injection molding is performed. The positioning member H is fixed to a metal mold, not shown.

As shown in FIG. 5, the retained part 15a is held by the retaining part 13a (refer to FIG. 2) of the accommodating portion 13. With the retained part 15a placed in the retaining part 13a of the accommodating portion 13, part of the retained part 15a is exposed. For example, part of the retained part 15a is the exposed surface 15c that forms one surface of the retained part 15a.

As shown in FIG. 4, the at least one hole 15b includes two holes 15b. The two holes 15b are recessed from the exposed surface 15c. The positioning member H is inserted in the two holes 15b. The insert element 9 is thereby positioned with respect to the metal mold.

As shown in FIG. 4, the second portion 17 is integrally formed with the first portion 15. The second portion 17 is formed with a tapered shape. As shown in FIG. 5, at least part of the second portion 17 is disposed in the proximal end part 7a of the leg portion 7. In this embodiment, the second portion 17 is disposed in the proximal end part 7a of the leg portion 7. The second portion 17 can be disposed both inside the proximal end part 7a and inside the distal end part 7b of the leg portion 7.

As shown in FIGS. 4 and 5, the second portion 17 has at least one recess 17a. The at least one recess 17a includes two recesses 17a1, 17a2. The two recesses 17a1, 17a2 are formed with a concave shape on the outer surface of the second portion 17. For example, one of the recesses 17a1 is formed on a front surface of the second portion 17. The other recess 17a2 is formed on a rear surface of the second portion 17.

The number of recesses 17a (17a1, 17a2) can be one, or three or more. The location for forming the recesses 17a (17a1, 17a2) can be different from the location described above.

As shown in FIG. 5, the thickness T between the outer surface of the second portion 17 and the outer surface of the leg portion 7 in a state in which the second portion 17 is disposed in the proximal end part 7a of the leg portion 7 is at least 1.5 mm. The thickness T between the outer surface of the second portion 17 and the outer surface of the leg portion 7 is up to 3.0 mm. That is, the thickness T between the outer surface of the second portion 17 and the outer surface of the leg portion 7 is at least 1.5 mm and up to 3.0 mm.

Here, the thickness T between the outer surface of the second portion 17 and the outer surface of the leg portion 7 is defined by the outer surface of the leg portion 7 and the outer surface of the second portion 17, excluding the recesses 17a (17a1, 17a2).

The thickness T between the outer surface of the second portion 17 and the outer surface of the leg portion 7 can be interpreted to be the thickness of the leg portion 7 (proximal end part 7a) disposed around the second portion 17. In this embodiment, the portion disposed in the recesses 17a (17a1, 17a2) in the leg portion 7 (proximal end part 7a) is excluded from the measurement target of the thickness T.

The reel body 1 with the configuration described above is formed in the following manner using metal molds for forming the foot portion 3, the housing 5, and the leg portion 7. First, the positioning members H fixed to the metal mold are respectively inserted into the two holes 15b of the insert element 9 (refer to FIG. 4). The insert element 9 is thereby positioned within the metal mold.

Here, the metal mold is disposed spaced apart from the insert element 9 such that the thickness T between the outer surface of the second portion 17 and the outer surface of the leg portion 7 is at least 1.5 mm and up to 3.0 mm. The metal mold comes in contact with the exposed surface 15c of the insert element 9. In this manner, the insert element 9 is secured to the metal mold by the two positioning members H and the exposed surface 15c, so that the insert element is stably disposed in the reel body without moving when the resin, described further below, is injected.

Next, heated resin is poured or injected into the metal mold. The space between the metal mold and the insert element 9 is thus filled with the heated resin. In this state, the resin is cooled. The cooling time of the resin is preferably at least 8 seconds and up to 12 seconds.

Next, after the resin has cooled, the foot portion 3, the housing 5, and the leg portion 7 are removed from the metal mold. The foot portion 3, the housing 5, the leg portion 7, and the insert element 9 are thus integrally formed.

The reel body 1 of the spinning reel described above has the following features.

In the reel body 1, the cross-sectional area (thickness) of the proximal end part 7a of the leg portion 7 is reduced by disposing at least part of the second portion 17 of the insert element 9 in the proximal end part 7a of the leg portion 7. As a result, the weight of the reel body 1 can be reduced, and the appearance of the reel body 1 can be improved. For example, by forming the insert element 9 from a lighter material than that of the foot portion 3, housing 5, and leg portion 7, the weight of the reel body 1 can be suitably reduced and the appearance of the reel body 1 can be improved.

In the reel body 1, the first portion 15 is disposed within the accommodating portion 13 such that at least part (exposed surface 15c) of the first portion 15 in the insert element 9 is exposed, so that the insert element 9 can be suitably positioned with respect to the proximal end part 7a of the leg portion 7 by the positioning member H.

In the reel body 1, since the second portion 17 is formed with a tapered shape, the cross-sectional area (thickness) of the proximal end part 7a of the leg portion 7 can be suitably reduced. In the reel body 1, the second portion 17 has at least one retaining part 13a, so that the second portion 17 and the leg portion 7 can be reliably integrated. Further, the second portion 17 can be prevented from falling off the leg portion 7.

In the reel body 1, the thickness T between the outer surface of the second portion 17 and the outer surface of the leg portion 7 is up to 3.0 mm, so that it is possible to suitably prevent the appearance of sink marks. In the reel body 1, the thickness T between the outer surface of the second portion 17 and the outer surface of the leg portion 7 is at least 1.5 mm, so that the material can be suitably flow at the time of injection molding.

In the reel body 1, the positioning member H is fixed to the metal mold. In this state, the positioning member H is inserted in the hole 15b of the first portion 15 in the insert element 9. As a result, the insert element 9 can be suitably positioned with respect to the proximal end part 7a of the leg portion 7.

Embodiments of the present invention can be used for a reel body for a spinning reel.

What is claimed is:

1. A reel body for a spinning reel, comprising:
   a foot portion configured to attach to a fishing rod;
   a housing having an accommodating portion for accommodating a mechanism, the accommodating portion including a retaining part;
   a leg portion extending from the housing toward the foot portion; and
   an insert element disposed in the housing and the leg portion,
   the foot portion, the housing, and the leg portion integrally formed by injection molding, and
   the insert element including a first portion, the first portion including a retained part that is positioned within an interior of the retaining part of the accommodating portion such that a single surface thereof is exposed relative to the retaining part, and a second portion that is integrally formed with the first portion and at least a part of which is disposed in a proximal end part of the leg portion, and the second portion including at least one recess formed on the outer surface thereof and having a concaved shape, a hole is disposed in the surface of the first portion and is configured to enable the first portion to be held by a positioning member when the injection molding is performed.

2. The reel body for a spinning reel according to claim 1, wherein the second portion has a tapered shape.

3. The reel body for a spinning reel according to claim 1, wherein a thickness between an outer surface of the second portion and an outer surface of the leg portion is less than or equal to 3.0 mm.

4. The reel body for a spinning reel according to claim 3, wherein the thickness between the outer surface of the second portion and the outer surface of the leg portion is greater than or equal to 1.5 mm.

5. The reel body for a spinning reel according to claim 1, wherein the at least one recess is disposed in a front surface of the second portion and along at least one outer side surface of the second portion.

6. The reel body for a spinning reel according to claim 1, wherein the at least one recess is disposed in a rear surface of the second portion and along at least one outer side surface of the second portion.

7. The reel body for a spinning reel according to claim 1, wherein the at least one recess includes surface extending traverse to the longitudinal direction of the insert element.

8. A reel body for a spinning reel, comprising:
   a foot portion configured to attach to a fishing rod;
   a housing having an accommodating portion for accommodating a mechanism, the accommodating portion including a retaining part;
   a leg portion extending from the housing toward the foot portion; and
   an insert element disposed in the housing and the leg portion,
   the foot portion, the housing, and the leg portion integrally formed by injection molding, and
   the insert element including a first portion, the first portion including a retained part that is positioned within an interior of the retaining part of the accommodating portion such that a single surface thereof is exposed relative to the retaining part, and a second portion that is integrally formed with the first portion and at least a part of which is disposed in a proximal end part of the leg portion, and the second portion including at least one recess formed on the outer surface thereof and having a concaved shape, a plurality of holes disposed in the surface of the first portion and configured to enable the first portion to be held by a plurality of positioning members when the injection molding is performed.

9. The reel body for a spinning reel according to claim 8, wherein the second portion has a tapered shape.

10. The reel body for a spinning reel according to claim 8, wherein a thickness between an outer surface of the second portion and an outer surface of the leg portion is less than or equal to 3.0 mm.

11. The reel body for a spinning reel according to claim 10, wherein the thickness between the outer surface of the second portion and the outer surface of the leg portion is greater than or equal to 1.5 mm.

12. The reel body for a spinning reel according to claim 8, wherein the at least one recess is disposed in a front surface of the second portion and along at least one outer side surface of the second portion.

13. The reel body for a spinning reel according to claim 8, wherein the at least one recess is disposed in a rear surface of the second portion and along at least one outer side surface of the second portion.

14. The reel body for a spinning reel according to claim 8, wherein the at least one recess includes surface extending traverse to the longitudinal direction of the insert element.

* * * * *